June 27, 1933.　　　J. OTTO ET AL　　　1,916,012
RESISTANCE WELDING
Original Filed Jan. 30, 1928
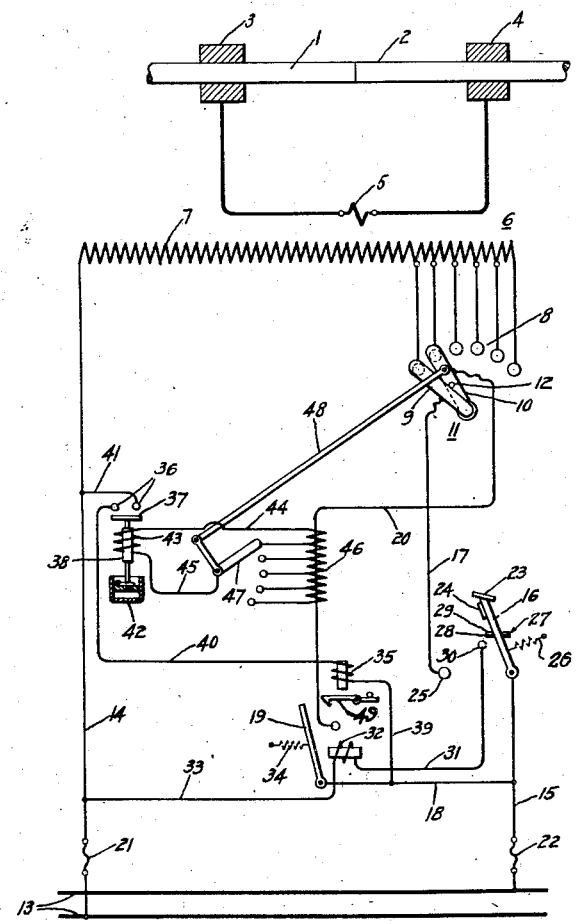
Inventors:
Johann Otto,
Eberhard Rietsch,
by *Alexander S. ...*
Their Attorney.

Patented June 27, 1933

1,916,012

UNITED STATES PATENT OFFICE

JOHANN OTTO, OF HENNIGSDORF, AND EBERHARD RIETSCH, OF TEGEL, GERMANY, ASSIGNORS TO GENERAL ELECTRIC COMPANY, A CORPORATION OF NEW YORK

RESISTANCE WELDING

Application filed January 30, 1928, Serial No. 250,669, and in Germany February 18, 1927. Renewed March 25, 1933.

Our invention relates to improvements in resistance welding and has as an object the provision of a method and apparatus by means of which the total welding period may be shortened.

In particular, our invention relates to that form of resistance welding known as flash welding.

A flash weld is in reality a butt weld that is made quickly starting with light contact pressure followed by a period of sparking with no pressure and finished with heavy pressure when a portion of the metal at the joint is thrown out in the form of a bur.

It has been found desirable, particularly with parts of large cross section, to heat the work parts initially prior to the welding process proper. This is accomplished by bringing the parts into engagement and passing a current through them as in the old process of butt welding until preferably a bright red heat is reached. Following this the parts are separated and the flash welding process instituted.

The voltage that may be applied to the work parts during the welding period is limited by the fact that if a certain voltage is exceeded pieces of metal are blown out from the joint leaving it with cracks and holes which render the welded structure unsuitable for the purpose of its manufacture. It is thus apparent that the amount of voltage that can be applied to the work parts during the welding period is limited. According to our invention the total period of welding is shortened by shortening the preheating period which of itself requires a longer time than the welding period proper. This we accomplish by applying during the preheating period a greater secondary voltage to the work parts than is used subsequently during the welding period.

The single figure of the drawing diagrammatically illustrates apparatus suitable for carrying into effect our improved process of welding forming the subject matter of our divisional application, Serial No. 602,798, filed April 2, 1932.

Referring to the drawing, the work parts 1 and 2 are held in suitable clamping members 3 and 4. The welding current in accordance with my invention is supplied from an inductive apparatus adapted to vary the welding voltage. As illustrated the members 3 and 4 constitute the terminals of the secondary 5 of a transformer 6. The primary 7 of this transformer 6 is provided with a plurality of terminals or taps 8 with which the contact fingers 9 and 10 of a switch 11 are adapted to make contact. As illustrated the contact fingers 9 and 10 are mechanically connected but electrically insulated from one another and means are provided, such as the pin 12 on finger 10, so that one finger must make contact with a tap at least one step higher than the tap with which the other finger makes contact. The contact fingers 9 and 10 may however be separated from one another various distances and will be adjusted by the welder relative to one another for different classes of work. It is, of course, apparent that other forms of switching means may be used instead of that illustrated so long as means are provided for predetermining two circuits through different taps of the winding of the transformer.

The untapped terminal of the primary 7 of transformer 6 is connected to one side of a source of supply 13 by a conductor 14. The tapped terminal of the transformer primary is connected to the other side of the source of supply 13 either by means of conductor 15, switch 16, conductor 17 and contact finger 9, or by conductors 15 and 18, circuit breaker 19, conductor 20 and contact finger 10. Protective devices indicated as fuses are provided at 21 and 22 in the conductors 14 and 15 between the welding machine and the source of supply.

The switch 16 is illustrated in the drawing as a foot switch provided with a tread 23 and a contact 24 adapted to engage a terminal 25 when the switch is depressed from its open position against the action of a spring 26 which acts to normally maintain the switch 16 in an open position. The switch is also provided with an additional contact member 27 which comprises an insulating strip 28 and a conductive strip 29. When the switch is depressed from its open position the insulating portion 28 of the contact 27 slides over the terminal 30 interposed in its path without completing a circuit through the switch 16 and this terminal 30. However, when the switch is allowed to return to its open position the conductive portion 29 of the contact 27 makes engagement with the terminal 30 completing a circuit through this terminal. The circuit completed through terminal 30 is as follows: One side of the source of supply through conductor 15, switch 16, contact 27, terminal 30, conductor 31, closing coil 32 of circuit breaker 19 and conductors 33 and 14 to the other side of the source of supply.

Circuit breaker 19 is normally biased to an open position by means of a spring 34 but upon being closed is held in the closed position by a latch 49. The latch 49 is controlled by a coil 35 whose circuit is completed at contacts 36 by a contact member 37 of relay 38, the circuit being as follows: From one side of the source of supply through conductors 15, 18 and 39, coil 35, conductor 40, contacts 36 and contact member 37 and conductors 41 and 14, to the other side of the source of supply.

Relay 38 is an overload time relay having a dashpot 42 and a coil 43 which is connected through conductors 44 and 45 to a current transformer 46 in the conductor 20. The secondary of the current transformer 46 is tapped and its connection with the operating coil 43 of the relay 38 is determined by a switch 47 which is mechanically connected by a member 48 to the switch 11 in such a manner that the relay is energized to substantially the same extent at all of the welding voltages predetermined by the switching means 11.

The method of operation is as follows: Work parts 1 and 2 are inserted in clamps 3 and 4 and brought into engagement with one another as shown in the drawing. The transformer 6 is then connected to the source of supply by depressing the foot switch 16 until the contact 24 engages the terminal 25 which then completes a circuit as follows: From one side of the source of supply through conductor 15, switch 16, contact 24, terminal 25, conductor 17, contact finger 9 of switch 11, primary winding 7 of transformer 6 and conductor 14, to the other side of the source of supply. This connection will cause a heating current to flow through the work parts and when the preheating operation has progressed sufficiently the operator releases the switch 16 which is then returned to the illustrated position by means of the spring 26. Upon its return, however, a circuit previously traced is completed through coil 32 by contact member 27 which causes the circuit breaker 19 to close thus completing a second circuit as follows: From one side of the source of supply through conductors 15 and 18, circuit breaker 19, conductor 20 and contact finger 10 of switch 11, through the primary of the transformer 6 and conductor 14 to the other side of the source of supply. This second circuit will impress upon the work parts a secondary voltage that is less than that of the secondary voltage impressed upon the work parts by reason of the first circuit traced since the number of primary turns has been increased. With the connection just traced the operator performs the flash welding operation following which he brings the work parts together in what is called an upsetting operation. When the parts 1 and 2 are brought firmly together an excessive current flows in the welding circuit and relay 38 connected to the welding circuit through transformer 46 by connections previously traced operates to complete a circuit through the tripping coil 35, also previously traced, to release the circuit breaker 19 which will open and thus interrupt the welding operation after a predetermined interval determined by the adjustment of the time delay means shown as dashpot 42.

While we have described a particular embodiment of our invention and certain apparatus for carrying out our method of welding it will be obvious to those skilled in the art that various modifications may be made without departing from our invention and we therefore desire in the appended claims to cover all such modifications as fall within the true spirit and scope of our invention.

What we claim as new and desire to secure by Letters Patent of the United States is:

1. Welding apparatus comprising means for supplying to the work parts heating current at two different voltages, a switch biased to an open position for connecting, when moved from its biased position, said current source at its higher voltage to said work parts, and means for connecting said current source at its lower voltage to said work parts when said switch is released to its biased position.

2. A welding machine comprising a welding transformer having a winding provided with taps, means for predetermining two circuits through different taps of said winding, a switch biased to one position and arranged to connect one of said circuits to a source of supply when moved from said biased position, means arranged on the return of said switch to its biased position for connecting the other of said circuits to said source of supply, and means depending on a predetermined flow of current in said second circuit for interrupting said circuit.

3. A welding machine comprising a transformer having a winding provided with a plurality of terminals, means for predetermining a plurality of circuits through different terminals of said winding, means for completing the working circuit initially through one of said terminals to preheat the work parts and finally through another of said terminals for decreasing the voltage applied to the work parts to fuse the work parts together, and an overload relay responsive to the increase of current occurring upon upsetting the work parts for interrupting said final connection.

4. A welding machine comprising a transformer having a winding provided with a plurality of terminals, means for predetermining a plurality of circuits through different terminals of said winding, means for completing the working circuit initially through one of said terminals to preheat the work parts and finally through another of said terminals for causing the voltage applied to the work parts to be decreased to fuse the work parts together, and means for interrupting said last connection after a predetermined current has been supplied to the work parts for a predetermined period of time.

5. A welding machine comprising a transformer having a winding provided with taps whereby the turn ratio of the transformer may be altered, switching means adapted to make engagement with said taps for predetermining circuits through the tapped winding of said transformer for adjusting the welding voltage, means for first completing one of said circuits and thereafter completing another of said circuits, an overload time relay responsive to the flow of current in said second circuit for disconnecting said transformer from the source of supply and means responsive to the setting of said circuit predetermining switching means for adjusting the circuit of said overload relay so that it is energized to substantially the same extent at all the welding voltages predetermined by said switching means.

6. A welding machine comprising a welding transformer having a primary winding provided with a plurality of terminals by means of which a greater or lesser number of the turns of said winding may be connected in a working circuit, means including a switch having a plurality of contact fingers for predetermining a plurality of circuits through different terminals of said primary winding, means for preventing said contact fingers from simultaneously engaging the same terminal of said primary winding, and means for connecting the circuit including the least number of turns to a source of supply to preheat the work parts before connecting another of said circuits to said source of supply to perform a welding operation.

In witness whereof, we have hereunto set our hands this 7th day of January 1928.

JOHANN OTTO.
EBERHARD RIETSCH.